March 12, 1963 — D. V. SINNINGER — 3,081,450
DIGIT DISPLAY APPARATUS
Filed May 1, 1958 — 6 Sheets-Sheet 1
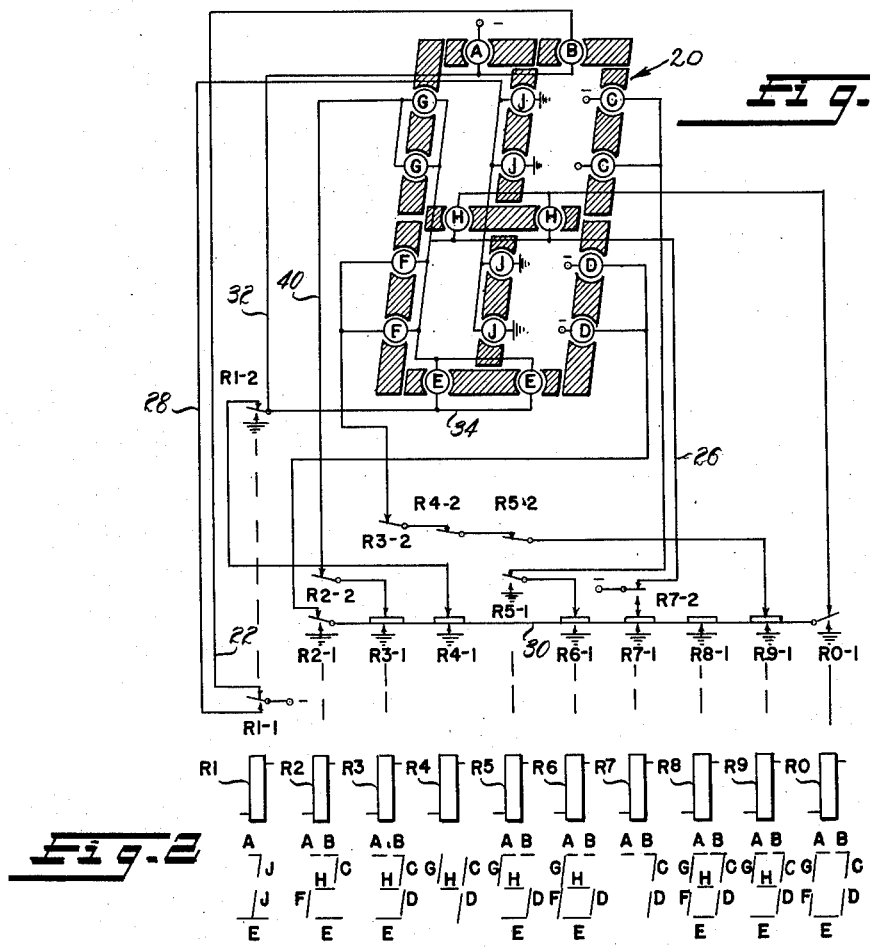
Fig. 1
Fig. 2
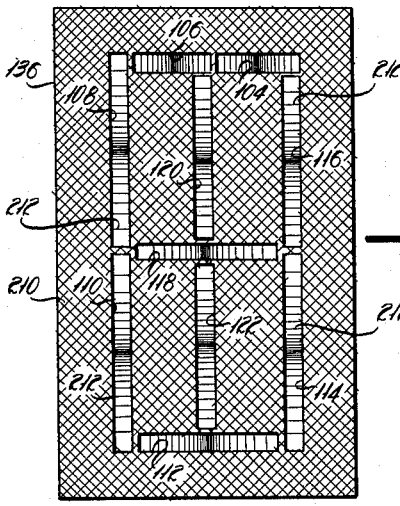
Fig. 16
INVENTOR
DWIGHT V. SINNINGER
BY Strauch, Nolan & Neale
ATTORNEYS March 12, 1963  D. V. SINNINGER  3,081,450
DIGIT DISPLAY APPARATUS
Filed May 1, 1958  6 Sheets-Sheet 2
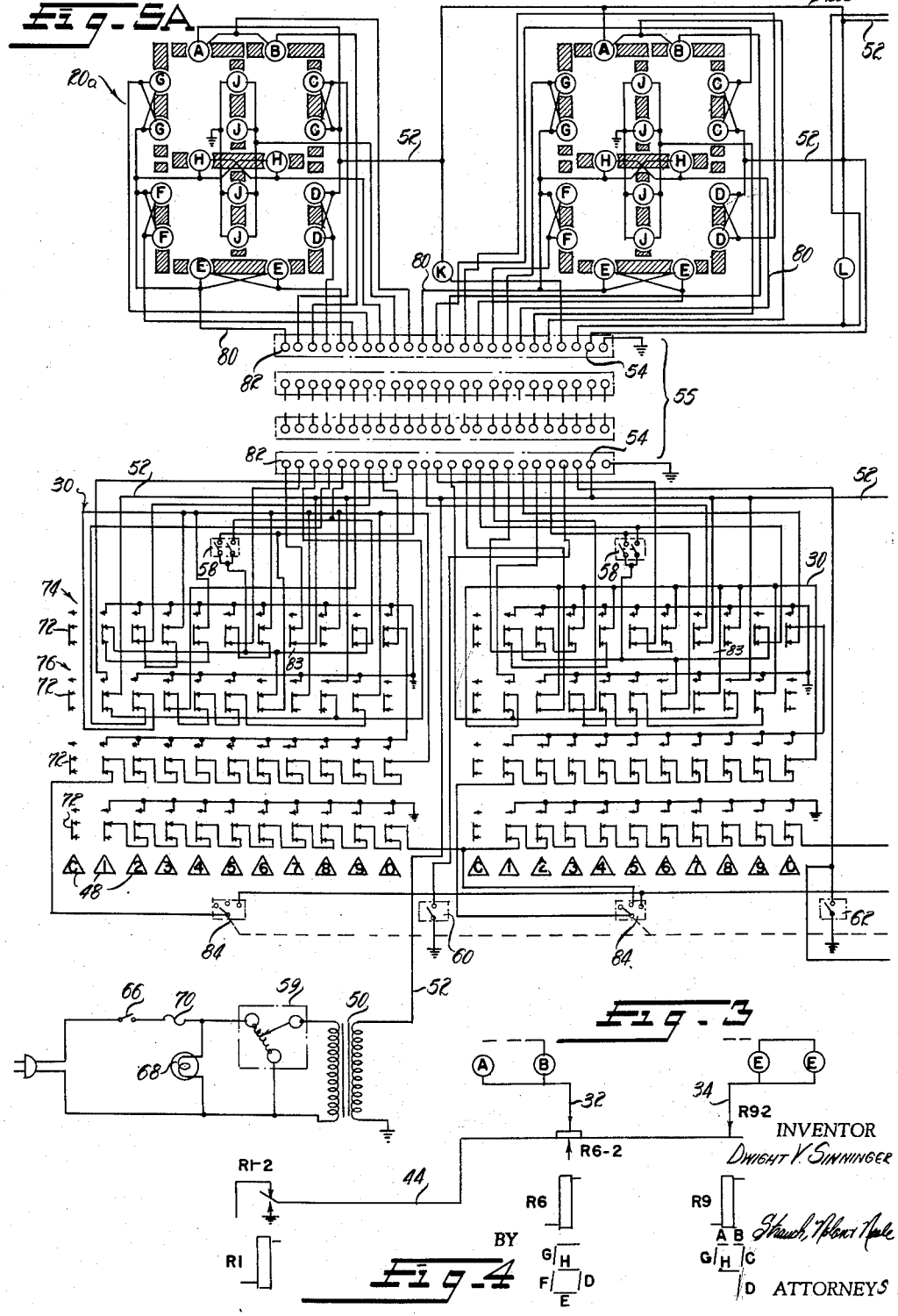
INVENTOR
DWIGHT V. SINNINGER
BY Strauch, Nolan & Hale
ATTORNEYS March 12, 1963   D. V. SINNINGER   3,081,450
DIGIT DISPLAY APPARATUS
Filed May 1, 1958   6 Sheets-Sheet 3

INVENTOR
DWIGHT V. SINNINGER

BY Strauch, Nolan & Neale

ATTORNEYS

March 12, 1963  D. V. SINNINGER  3,081,450
DIGIT DISPLAY APPARATUS
Filed May 1, 1958  6 Sheets-Sheet 4
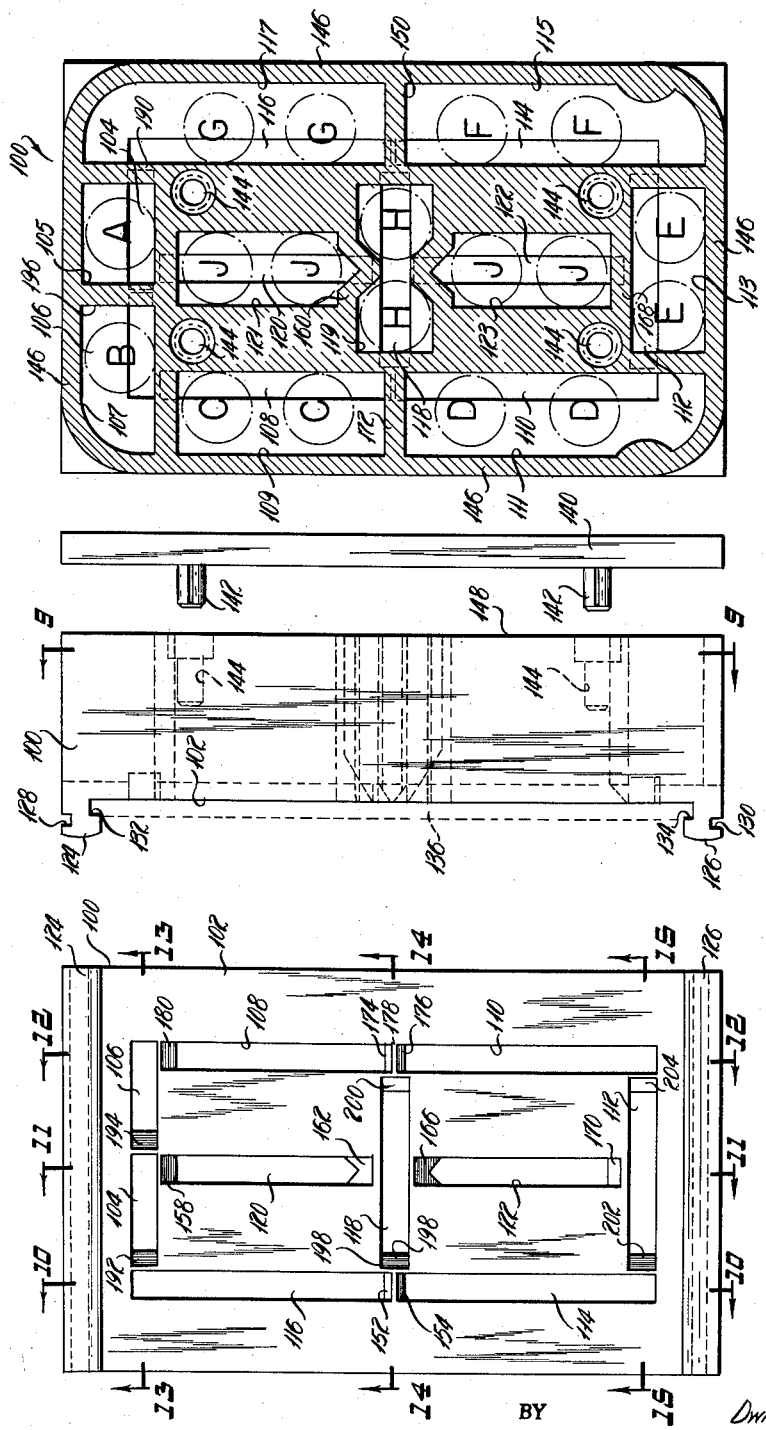
INVENTOR
Dwight V. Sinninger
Strauch, Nolan & Neale ATTORNEYS March 12, 1963 D. V. SINNINGER 3,081,450
DIGIT DISPLAY APPARATUS
Filed May 1, 1958 6 Sheets-Sheet 5
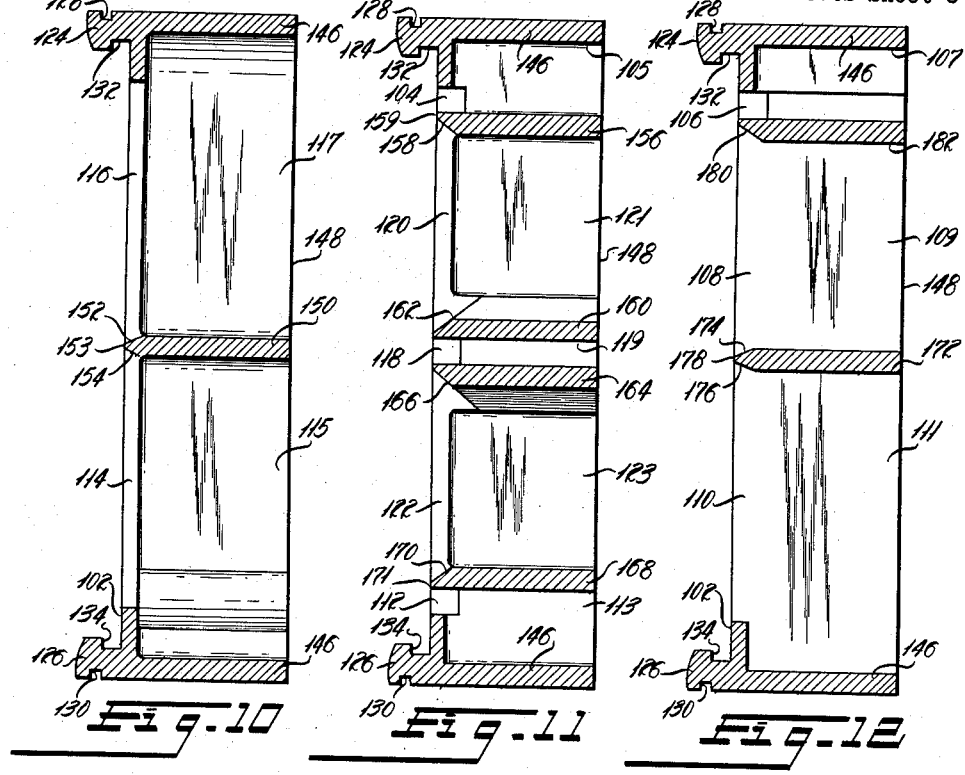
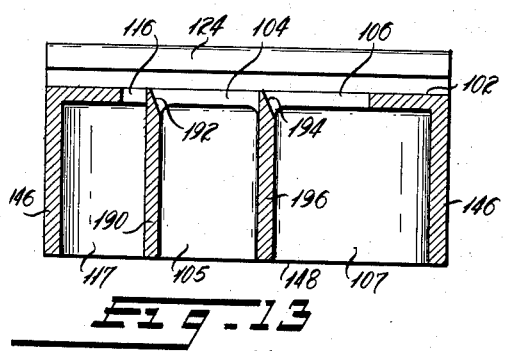
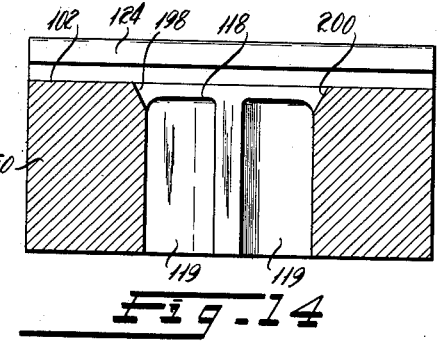
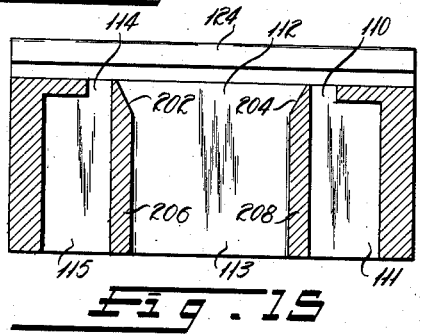
INVENTOR
DWIGHT V. SINNINGER
BY Strauch, Nolan & Neale
ATTORNEYS March 12, 1963 — D. V. SINNINGER — 3,081,450
DIGIT DISPLAY APPARATUS
Filed May 1, 1958 — 6 Sheets-Sheet 6

INVENTOR
DWIGHT V. SINNINGER
BY Strauch, Nolan & Neale
ATTORNEYS

United States Patent Office 3,081,450
Patented Mar. 12, 1963

3,081,450
DIGIT DISPLAY APPARATUS
Dwight V. Sinninger, Oak Park, Ill., assignor to Senn Custom, Inc., Oak Park, Ill., a corporation of Illinois
Filed May 1, 1958, Ser. No. 732,315
15 Claims. (Cl. 340—336)

This invention relates to number display systems of the illuminated type, and more particularly to digit modules and associated circuitry for selectively producing a visible image of a plural digit number.

Heretofore, in known number display systems, the individual numbers or digits were formed by illuminating selected segments disposed in a predetermined pattern needed to form the desired digits by an addition method. This prior method involved a complex circuit arrangement where the digit to be illuminated was composed of several segments and required energization of substantially more than half the circuits on the average to produce the several digits 1 through 9 and 0, except of course in the case of the digit 1.

A principal object of the present invention is to provide a more simplified and economic circuit arrangement for controlling a system wherein a plurality of illuminated digits may be individually displayed in a single plane, and wherein a combination of elongated segments are selectively illuminated to form the individual digits of a plural digit number. According to one feature of this invention, the elongated segments are controlled using a subtraction method wherein the circuit arrangement causes substantially all of the segments to be normally connected to be energized and the unneeded segments are selectively disconnected to form the desired digit, thereby permitting the use of a more simplified and economical circuit arrangement.

Another object of this invention is to provide a multi-digit display system wherein zeros are automatically provided when no digit is specifically selected.

Still a further object of the present invention is to provide a novel circuit arrangement whereby the segments used to produce the digit 7 are directly connected to one side of the power supply and the segments used to produce the digit 8 which are not used to produce the digit 7 are connected to the said one side of the power supply through a switch contact on the selecting apparatus for the digit 7 and all of the segments required for producing the digit 8 are connected to a common control conductor which is selectively grounded by the several digit selecting keys.

Another principal object of this invention is to provide a novel digit module which is of the seven segment type for producing the digits 1 through 9 and 0. In the preferred form, the module has a special centrally located segment for displaying the digit 1 to enhance the legibility of a multi-digit number.

A further object of the invention is to provide a novel digit module construction which uses inexpensive lamps to illuminate the elongated segments or housing apertures through channels having walls of light reflecting material and covered with a translucent cover plate upon which the digital indication is displayed. The elongated segments are narrower in size than is the diameter of conventional inexpensive lamps and the elongated segments may be provided either by appropriate tapering of the walls in the module structure or by suitable masking on the translucent cover plate.

A further principal object of the invention is to provide a novel translucent cover plate having a mask coating to provide the elongated character segments selectively illuminated to produce the digits 1 through 9 and 0.

Still another object of this invention is to provide uniform light intensity throughout the entire length of each elongated character segment. In accordance with one embodiment of this invention, opaque lines are so spaced along the elongated character segment as to provide a variable density filter which permits uniform illumination to be obtained even with a point source of light.

These and other objects of the invention will become more fully apparent from the following description and claims, and from the appended drawings wherein:

FIGURE 1 is a view of a digit module of the type having seven segments shown diagrammatically and a simplified circuit diagram illustrating the subtractive type circuit for controlling the selective illumination of the several lamps forming the matrix of the module;

FIGURE 2 is a schematic representation of the several digits as displayed by the module of FIGURE 1;

FIGURE 3 shows parts which can be added to the circuit of FIGURE 1 to produce the digits 6 and 9 in a modified form;

FIGURE 4 shows in schematic form the modified digits 6 and 9 which may be produced when the circuit of FIGURE 3 is added to the circuit of FIGURE 1;

Figure 5B:
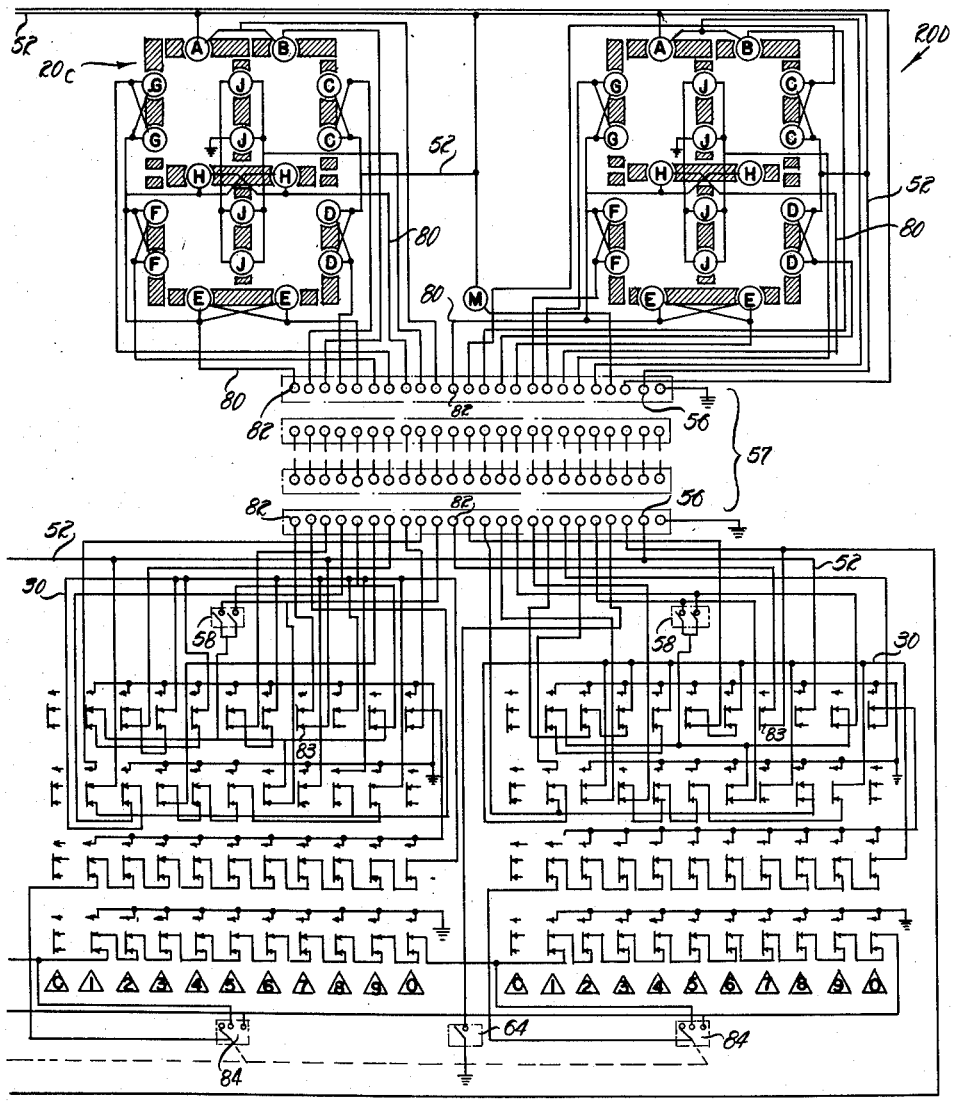
Figure 6:
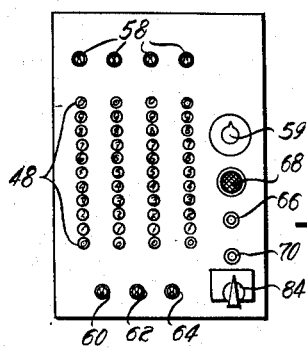
Figure 17:
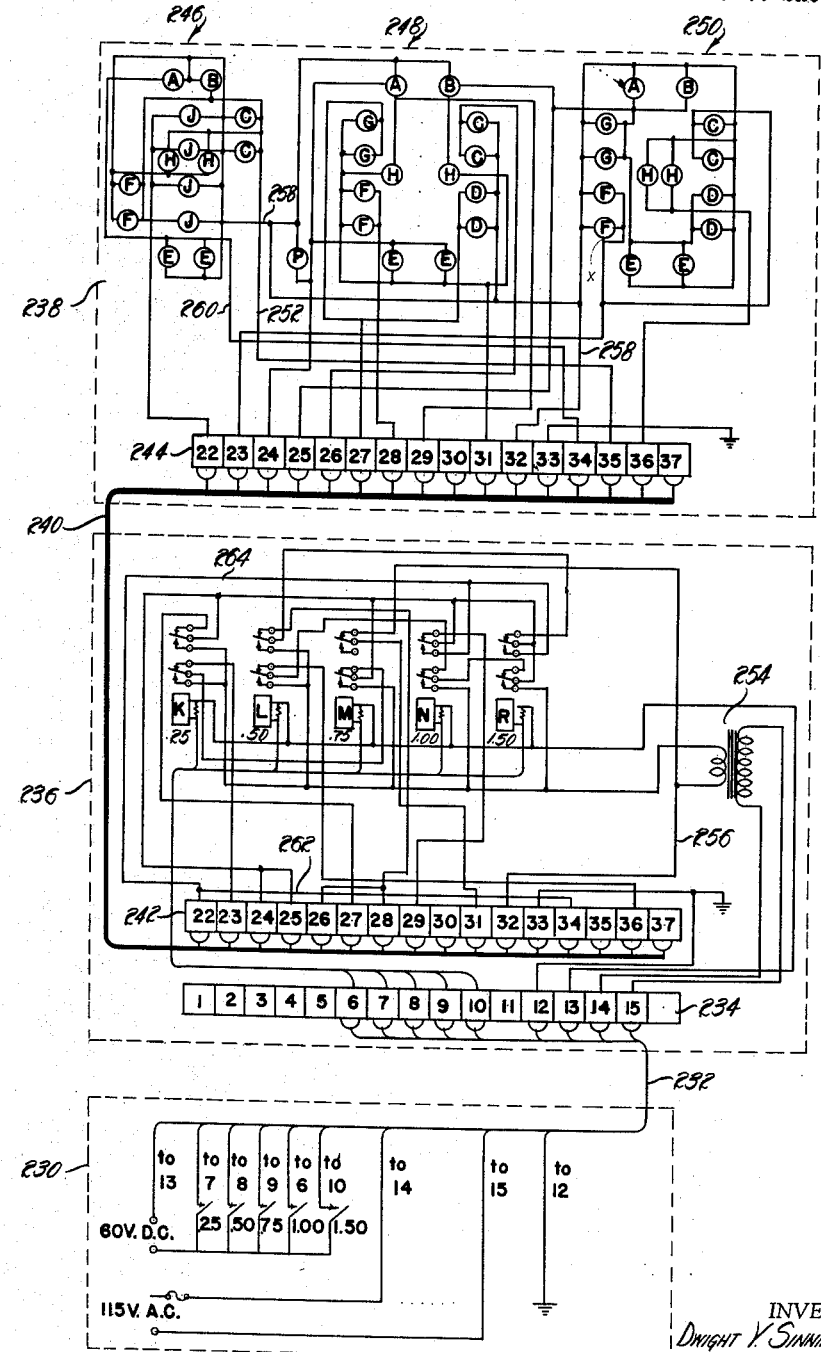

FIGURES 5A and 5B placed side by side form a circuit diagram of a plural digit number system adapted for use in stock market quotation systems or for any other similar purpose;

FIGURE 6 is a diagram of the control board for the number display system shown in FIGURES 5A and 5B;

FIGURE 7 is a front view of the digit module structure of the present invention;

FIGURE 8 is a side view of the module structure of FIGURE 7;

FIGURE 9 is a rear view of the module structure of FIGURES 7 and 8 in section taken along lines 9—9 of FIGURE 8;

FIGURE 10 is a side view in section of the module structure taken along lines 10—10 of FIGURE 7;

FIGURE 11 is a side view in section of the module structure taken along lines 11—11 of FIGURE 7;

FIGURE 12 is a side view in section of the module structure taken along lines 12—12 of FIGURE 7;

FIGURE 13 is an end view in section of the module structure taken along lines 13—13 of FIGURE 7;

FIGURE 14 is an end view in section of the module structure taken along lines 14—14 of FIGURE 7;

FIGURE 15 is an end view in section of the module structure taken along lines 15—15 of FIGURE 7;

FIGURE 16 is a front view of a translucent cover plate having an opaque coating serving as a mask with narrow rectangular slots serving as the character segments covered with a variable density filter; and FIGURE 17 is a circuit diagram of a three digit number display system adapted to be used in a particular toll recording installation wherein only five different numbers composed of plural order digits are required to be displayed thereby resulting in certain simplifications of the wiring diagrams.

Referring now to FIGURE 1, the digit module 20 of the present invention is shown connected to one form of a suitable switching arrangement which together compose the means for producing a visual image of any digit 1 through 9 and 0. The module 20 has 18 lamps designated A through J with lamps designated by the same letter being connected electrically in parallel to be simultaneously energized.

Basically the digital indicating pattern comprises seven independently illuminated segments serving as character bars, three of which are horizontal and include the top horizontal row having lamps A and B, a middle horizontal row having lamps H, and the bottom horizontal row having lamps E, and four of which are vertical including a first pair lying in a left vertical row having lamps F and G and a second pair lying in a right vertical row having lamps C and D. From the foregoing arrangement of lamps which are arranged to provide elongated rectangular strips of light, each of the digits 2 through 9 and 0 can be obtained in a manner shown by FIGURE 2.

The digit 1 can also obviously be obtained by energizing lamps C and D or lamps F and G. It has, however, been found that by modification of this basic unit the readability of the digital indication, particularly in plural digit numbers, is greatly enhanced by providing a special, centrally located vertical segment for indicating the digit 1 and hence lamps J have been provided. Also, to further enhance readability of the digit 1, lamp A is illuminated along with lamps E when digit 1 is displayed. Thus the preferred form deviates slightly from a digit module using the basic seven segment pattern composed of the three horizontal and four vertical segments identified above.

Another feature which improves readability of the digital indication is the slanting of the vertical character segments with the top horizontal segment off-set to the right as illustrated in FIGURE 1 so that the vertical segments make an angle of between 80° and 90° with the horizontal segments or character bars. The preferred angle is about 82 or 83 degrees which corresponds to slope of about 7 or 8 degrees from the vertical.

The physical structure of the digit module will be described below in greater detail in connection with FIGURES 7-15. For purposes of understanding the following description of a novel and preferred circuit arrangement for selectively energizing the several lamps A through J, it is sufficient to understand that the shaded rectangular area surrounding each lamp serving as the character element bar or segment is illuminated when the associated lamp is energized, and that the rectangular areas have the same appearance as the background when the associated lamp is not energized. Lamps A through J may be of any suitable type such for example as a gas discharge type or a filament type and energized with either A.C. or D.C.

The wiring system in accordance with this invention is a subtractive type rather than an additive type as was heretofore generally used. By this it is meant that the circuit is so designed that ordinarily all the lamps are energized when a digit is selected, excepting for the special case of the digit 1, and the digit selector switch disconnects circuits to the lamps which are not needed to produce the particular digit selected. This effects an economy of contacts and wiring because the A lamp is energized for each digit except 4, the B lamp is energized for each digit except 1 and 4; the C lamp is energized for each digit except 1, 5 and 6; the D lamp is energized for each digit except 1 and 2; the E lamp is energized for each digit except 4 and 7 and so forth. An exception applies in the case of the J lamps which are specially provided for use only with the digit 1, and the F and G lamps are energized for only about half of the digits 1 through 9 and 0. In view of the fact that on the average the lamps are energized well over half the time, the subtractive system permits a system to be set up requiring no more than two separate contact sets per switch.

As clearly shown in FIGURE 1, one terminal of each of lamps A, C and D is connected directly to a negative power supply terminal. One terminal of lamp B is connected by lead 22 through contact R1-1 to the negative supply terminal and the other terminal 24 of lamp B is connected so that lamp B is in parallel with lamp A except when relay R1, corresponding to digit 1, is energized. This circuit arrangement provides the proper operation of lamps A and B for each of the digits as shown in FIGURE 2.

Negative voltage is applied on conductor 26 through normally closed contacts R7-2 to lamps E, F, G and H which lamps are not energized when the digit 7 is displayed. One terminal of the lamps J is connected directly to ground and the other terminal from lamps J is connected to the negative power supply terminal through lead 28, contacts R1-1 when the 1 digit is selected and relay R1 is energized. At all other times lamps J are de-energized.

A characteristic feature of the present invention is the common conductor 30 which is normally floating and adapted to be directly connected to ground by the front contact of any one of switch contacts R2-1, R3-1, R4-1, R6-1, R7-1, R8-1, R9-1 and R0-1. Contact R5-1 also grounds conductor 30, but through the back contact of switch contacts R6-1.

The desired digit is selected by energizing the corresponding control relay R1-R0. The control relays may be actuated by push-buttons in any suitable manner, such as by locking push-buttons, lever keys or the like, or the relays may be replaced by suitable switches as shown in FIGURES 5 and 6. Upon operating, relays R1 to R0 selectively energize lamps A to J thereby illuminating segments A to J to form the corresponding digits 1 to 9 and 0 respectively as shown in FIGURE 2.

To display the digit 1 as viewed in FIGURE 2, relay R1 is operated to light lamps A, E and J. At front contacts R1-2, relay R1 grounds wires 32 and 34 to light lamps A and E respectively. The operative circuit for lamps E is from ground on wire 34, lamps E, and wire 26 to the negative power supply terminal at contacts R7-2. At its front contacts R1-1, relay R1 extends the negative power supply potential via wire 28 to light lamps J. Lamp B is kept extinguished because the moving contact of switch contacts R1-1 is disconnected from lead 22. All other lamps are extinguished because conductor 30 is not connected to ground.

Upon de-energizing relay R1, lamps A, J and E are extinguished and the circuit returns to its normal illustrated darkened condition.

To display the digit 2, relay R2 is operated to light lamps A, B, C, E, F and H. Relay R2 opens the operate circuit for lamps G at its contacts R2-2 and opens the operate circuit for lamps D at the back contact of R2-1. The common control conductor 30 is connected to ground by the front contact of R2-1 to energize the desired lamps. Ground is extended from lead 30 via back contacts R4-1 and back contacts R1-2 to wires 32 and 34 to light lamps A, B and E. The operate circuit for lamp B is completed to the negative power supply terminal at back contacts R1-1. Lamps C are energized from ground on lead 30 via back contacts R6-1 and normally closed contacts R5-1. Lamps H are energized from ground on lead 30 via a circuit including normally closed back contacts R0-1, lamps H and lead 26 to the negative power supply terminal at contacts R7-2. Lamps F are energized from ground on lead 30, back contacts R9-1 and contacts R5-2, R4-2 and R3-2.

To display the digit 3, relay R-3 is energized to light lamps A, B, C, D, E and H. At contacts R3-2 the operate circuit for lamps F is opened; at back contacts R3-1, the operate circuit for lamps G is opened; and at front contacts R3-1, the common control conductor 30 is connected to ground to light the desired lamps. The operate circuit for lamps D is from ground on lead 30 via back contacts R2-1. The operate circuit for lamps A, B, C, D, E and H is from ground on the common control conductor 30 as described in the production of the digit 2.

To display the digit 4, relay R4 is operated to light lamps C, D, G and H. At contacts R4-2 the operate circuit for lamps F is opened; at back contacts R4-1 the operate circuit for lamps A, B and E is opened; and at front contact R4-1, common control conductor 30 is connected to ground to light the desired lamps. The operate circuit for lamps G is from ground on common control conductor 30 via back contacts R3-1, R2-2, lead 40 to lamps G and to the negative power supply terminal through lead 26 and contacts R7-2. The operate circuit for lamps C, D and H is from ground on lead 30 as described in the production of the digits 2 and 3.

To display the digit 5, relay R5 is operated to light lamps A, B, D, E, G and H. At contacts R5–2 the operate circuit for lamps F is opened; at back contacts R5–1 the operate circuit for lamps C is opened; and at front contacts R5–1, common control conductor 30 is connected to ground to light the desired lamps through circuits described above.

To display the digit 6, relay R6 is operated which lights all of the lamps excepting lamps C and J. At back contacts R6–1 the operate circuit for lamps C is opened; and at front contacts R6–1 common control conductor 30 is connected to ground to light the remaining lamps, except for lamps J which are under control of relay R1.

To display the digit 7, relay R7 is operated to light lamps A, B, C and D. At contacts R7–2, lead 26 is disconnected from the negative power supply terminal thereby preventing lamps E, F, G and H from lighting. At contacts R7–1, common control conductor 30 is connected to ground to energize the desired lamps through circuits previously described.

To display the digit 8, relay R8 is operated which lights all lamps, excepting lamps J, by simply applying ground to common control conductor 30.

To display the digit 9, relay R9 is operated which lights all lamps, excepting lamps F and J. At back contacts R9–1 the operate circuit for lamps F is opened; and at front contacts R9–2 the common control lead 30 is connected to ground to light the desired lamps.

To display the digit 0, relay R0 is operated which lights all lamps excepting lamps H and J. At back contacts R0–1 the operate circuit for lamps H is opened; and at front contacts R0–1 the common control lead 30 is connected to ground thereby lighting lamps A, B, C, D, E, F and G.

FIGURE 3 shows modifications of the circuit of FIGURE 1 for displaying digits 6 and 9 without tails as shown in FIGURE 4. A circuit through the contacts associated with relays R1 and R6 prevents lamps A and B from lighting when relay R6 is energized. Lead 32 is extended from an added contact R6–2 which has its movable element connected to switch contact R1–2 through lead 44. The energization of relay R6 to display the digit 6 additionally opens the operate circuit for lamps A and B.

A circuit through the contacts associated with relays R1 and R9 prevents lamps E from lighting when relay R9 is energized. Lead 34 is connected to added contact R9–2, the movable element of which is connected to switch contact R1–2 through lead 44. The energization of relay R9 to display the digit 9 additionally opens the operate circuit for lamps E.

It will be observed that each of the relays R1 to R0 requires only two sets of contacts even with the additional circuitry required to remove the tails from the digits 6 and 9. Similarly, push-button switches may be used which are commercially available which require only two banks of switch contacts where the use of relays is not desired.

Ignoring for the moment the circuitry used for providing the digital indication of the digit 1 and in particular the circuitry connected to lamps J, one terminal of each of lamps A, B, C and D is connected directly to one terminal of the power supply with the other terminal of said lamps A, B, C and D connected to the common control conductor 30 to be energized when the number 1 contacts of any of the relays R2 through R0 is energized to the other terminal of the power supply which is shown in FIGURE 1 as ground. The lamps which are not used when the digit 7 is displayed are each connected to the negative power supply terminal through relay contacts R7–2 thereby assuring that lamps E, F, G and H remain de-energized when relay R7 is energized. The circuit from each of the lamps to ground is completed through the common control conductor 30 by the number one contacts on the several relays and a second set of contacts is provided with each relay, excepting for the relay associated with the digit 8, to further selectively disconnect any lamps which are not to be energized when a particular digit is selected. In the case of the digit 8, all of the lamps A through H are energized and thus there is no need for a second set of contacts with the relay R8.

Referring now to FIGURES 5A and 5B, there is illustrated a typical installation of a four-digit number display system wherein the digit modules 20A, 20B, 20C and 20D are adapted to be mounted in a position remote from the position of the control panel shown in FIGURE 6. The control panel in FIGURE 6 contains four banks of eleven-key switches, one bank for each of the digit modules 20A, 20B, 20C and 20D. The keys 48 on the control panel correspond to the triangular shaped keys carrying the legends C, 1, 2 . . . 9 and 0 in each of the four orders in FIGURES 5A and 5B. Each key actuated switch assembly bank, which is of conventional construction, is mechanically constructed so that the depression of one key releases the previously depressed key and the key marked C is used as a correction key.

As shown in FIGURE 5A, a power supply is provided having a transformer 50 with one terminal of the secondary winding grounded and the other terminal connected to lead 52 which supplies power to all of the lamps A through J in each of the digit modules. Lead 52 is connected to pins 54 in cable terminals 55 in FIGURE 5A and to the corresponding pins 56 in cable terminals 57 in FIGURE 5B, and all leads marked 52 are connected directly to the ungrounded terminal of the secondary transformer 50.

A suitable voltage control device such as powerstat 59 may be provided for adjusting the voltage on the lamps A through J in the digit modules to control the intensity of the illuminated digital indications in accordance with the light requirements in the particular installation. Control knob 56 in FIGURE 6 is positioned on the control panel so that the operator may adjust the intensity of the lamps.

In the illustrated embodiment four two-pole double throw switches 58 are provided in FIGURES 5A and 5B, one with each digit module circuit, which permits contacts R6–2 and R9–2 shown in FIGURE 3 to be selectively used so that the tails on the digits 6 and 9 will be deleted as shown in FIGURE 4, or not used in accordance with the preference of the operator.

Lamps K, L and M which are located between the several digit modules serve as decimal points and are selectively illuminated by manually operated switches 60, 62 and 64 respectively. The control panel of FIGURE 6 also contains the on-off switch 66, and indicator lamp 68, and fuse element 70 shown in the power input circuit in FIGURE 5A.

Referring now to the push-button key actuated contacts for controlling the digital indications of the digit modules, when a key 48 is pressed, the slider 72 shown in connection with the correction key C for digit module 20A moves upwardly to bridge the top contact with the center contact and disconnect the lower contact of each group of three from the center contact in a manner well known to those skilled in the art. All of the sliders 72 shown in vertical alignment in FIGURES 5A and 5B are mechanically linked together. The upper switch group 74 and the adjacent lower switch group 76 carry the contacts which correspond to the relay actuated switching contacts shown in FIGURE 1. The wiring circuit diagram is in effect the same as that shown in FIGURE 1 with the exception that many of the extra contacts provided corresponding to contacts not shown in the switching circuit of FIGURE 1 are connected also to ground or to provide parallel circuits with other switching contacts to improve the reliability and lengthen the maintenance free life of the apparatus.

The common control conductor 30 in FIGURE 1 has its equivalent present in each of the four switching circuits for the modules shown in FIGURES 5A and 5B also designated with the reference numeral 30. It will be observed that the center contacts of the switch in group 76 associated with the digits 2, 7 and 9 are connected to the common control conductor 30. For the digits 3, 4, 5, 6, 8 and 0, the center contact in group 74 is connected to the common control conductor 30. It is, of course, immaterial which of groups 74 or 76 carries the contact connected to common control conductor 30. In each of the above-mentioned switch contacts, the upper switch contact closes when the associated key is depressed and is connected to ground. Corresponding circuit connections are provided for each of the digit modules 20B, 20C and 20D.

The ungrounded terminal from the secondary transformer 50 designated throughout FIGURES 5A and 5B as lead 52 is connected directly to lamps A, C, and D. Power from the ungrounded terminal on lead 52 to lamps E, F, G and H, which it will be observed are disconnected when the digit 7 is illuminated, is supplied through lead 80 and cable pins 82 to the normally closed contacts 83 in switch group 74 of the switch operated by the key designated 7. The corresponding parts for the digit modules 20B, 20C and 20D and switching systems are indicated by the same reference numerals 80, 82 and 83. The remaining switch contacts in switch banks 74 and 76 are used for the purpose of selectively disconnecting power from the lamps which are to remain de-energized when a particular digit is produced.

As a further feature of the number display system described in FIGURES 5A and 5B, switch 84 is provided to control the posting of zeros. Switch 84 is a three-position switch having a separate set of contacts for each of the four orders and when in the position illustrated, there is no automatic posting of zeros. When switch 84 is in its center position, the posting of any number results in zeros being posted to the right of the selected digit. For example if push-button 6 associated with digit module 20B is posted, there will automatically be posted zeros in digit modules 20C and 20D. With switch 84 turned to its right-hand position, zeros are automatically posted on any digit module where the control circuit push-button is not pressed.

Referring now to FIGURES 7 through 15 and in particular to FIGURES 7, 8 and 9, the digit module 100 of the present invention is formed of any suitable opaque material such as a metal or plastic and is of a suitable size so that the digital indications can be easily observed from a distance. For stock market exchange installations, digits were found to be satisfactory where the digital indication field was about 2 inches wide by 3½ inches high. The digital indication field is shown on front face 102 in FIGURE 7.

Front face 102 is generally planar and is provided with elongated apertures or slots 104, 106, 108, 110, 112, 114, 116, 118, 120 and 122 which provide in operation lines or narrow bars of light having sharply defined edges which serve as segments from which the several digits 1 through 9 and 0 are selectively formed.

At the upper and lower edges of front face 102, forwardly extending projections 124 and 126 are provided for facilitating the mounting of the digit module in a suitable support or frame so that several module structures 100 may be placed in a side-by-side relation to display plural order numbers. Outside grooves 128 in upper projection 124 and outside groove 130 in lower projection 126 permit the module structure to be mounted flush on a metal panel with the edges of the panel fitting in grooves 128 and 130.

An inside groove 132 in upper projection 124 and corresponding groove 134 in lower projection 126 provide horizontal grooves for supporting a front cover plate 136 shown in dotted lines in FIGURE 8. Cover plate 136 is preferably a translucent plastic material such as milky Lucite, and in this embodiment is positioned adjacent front face 102 to diffuse the light so that there is uniform intensity throughout the length of the apertures 104 through 122 even though the lamps provide a point source of illumination. Also, colored digital indications can be obtained by the use of translucent light diffusing covers 136 appropriately colored or tinted which are available commercially.

A base 140 of any siutable material is provided with the necessary sockets for lamps A through J as shown in the preceding figures. Suitable fastening means such as banana plugs 142 are provided to secure base 140 to housing 100 by frictionally engaging bores 144 in housing 100 as shown in FIGURES 8 and 9. There is no electrical connection between the housing 100 and the base 140 and the base is easily removable from housing 100 to permit replacement of lamps as they burn out and cleaning of the interior of the module structure.

As shown in FIGURE 9, the module housing comprises generally a rectangular peripheral wall 146 having a suitable thickness to provide rigidity to the housing structure. The rear surface 148 is generally planar and contains in addition to holes 144 for receiving banana plugs 142, enlarged cavities having walls 105, 107, 109, 111, 113, 115, 117, 119, 121 and 123 which provide light tight channels extending from rear face 148 of housing 100 where the several lamps are mounted through to the elongated apertures 104, 106, 108, 110, 112, 114, 116, 118, 120 and 122 respectively in front face 102. The outline of the lamps A through J is shown in each of the cavities in FIGURE 9 and the walls 105 through 123 in the several cavities are covered with a light reflective coating such as white paint and suitably tapered to form the rectangular slotted openings 104 through 122.

Referring now to FIGURE 10 which is a sectional view along lines 10—10 of FIGURE 7, the pair of apertures 114 and 116 which are in an end-to-end relation and on the left side of the digital display field are clearly illustrated. The associated light cavities having walls 115 and 117 are separated by a partition or wall 150. The upper edges 152 and 154 of partition 150 are tapered so that the lower end of aperture 116 and the upper end of aperture 114 are separated only by an extremely small unilluminated area 153 to thereby give a visual appearance of an integral line for digits such as 6 and 8 where both apertures 114 and 116 are illuminated.

Referring now to FIGURE 11 apertures 104, 120, 118, 122 and 112 are shown together with their corresponding chambers having side walls 105, 121, 119, 123 and 113. A partition 156 is provided between walls 105 and 121 which has a sloping surface 158 which is effective to narrow the distance on surface 159 between the bottom side of aperture 104 and the upper side of aperture 120 to thereby reduce the unilluminated space between the top horizontal segment illuminated by lamp A and the upper half of the vertical segment illuminated by lamps J when the digit 1 is displayed.

Referring now to FIGURES 9, 11 and 14, the central cavity for lamps H defined by walls 119 associated with aperture 118 is separated from the cavity having walls 121 associated with aperture 120 by wall 160 having a sloping surface 162. A similar wall 164 with sloping surface 166 is provided between the cavity for the lamps H having walls 119 and the cavity for the lower bank of lights having walls 123 as shown in FIGURE 7, the sloping surfaces 162 and 166 join as closely as possible to the sides of aperture 118 to thereby produce the smallest possible space between the upper aperture 120 and lower aperture 122 which together form the main body of the digit 1.

A further partition 168 is located between the lower end of the cavity having walls 123 associated with aperture 122 and the top wall of the bottom horizontal cavity having walls 113. A sloping surface 170 is provided to narrow the vertical extent of surface 171 between the bottom of aperture 122 and the top wall of aperture 112 so that the base of the digit 1 appears associated with the main vertical portion thereof.

Referring now to FIGURE 12 a central partition 172 is provided between the cavities having walls 109 and 111 which are associated with apertures 108 and 110 respectively. The front faces of partition 172 are sloping surfaces 174 and 176 which are separated by a small surface 178 which is in alignment with the center of aperture 118.

The upper end of slot 108 terminates adjacent the sloping surface 180 on partition 182 which separates the cavity having walls 109 from the cavity having walls 107 associated with the aperture 106.

Referring now to FIGURE 13 which is a sectional view taken along lines 13—13 of FIGURE 7, a first wall or partition 190 is provided between the chamber associated with aperture 116 having walls 117 and the chamber associated with aperture 104 having walls 105. At the front face 102 of the housing structure 100 partition 190 has a sloping face 192 which reduces the unilluminated space between aperture 104 and aperture 116. A similar sloping surface 194 is provided on partition 196 which separates the chambers having walls 105 and 107.

Sloping surfaces 198 and 200 are provided at the ends of aperture 118 as are clearly shown in FIGURES 14 and 7, and in FIGURE 15 the sloping surfaces 202 and 204 are provided on partitions 206 and 208 respectively which separate the cavities having walls 115 and 111 from the cavity having walls 113.

It is apparent from the foregoing, that the housing structure is rigidly constructed with walls of a thickness sufficient to withstand all physical handling without damage while at the same time having narrow division lines between the several segments which are independently illuminated which provide a minimum amount of variation in the illumination intensity of the digital pattern formed by the combination of adjoining segments. Where the material is cast aluminum, the minimum wall thickness which can be cast satisfactorily is about ⅛ inch. The space between the several adjacent apertures is preferably no greater than about ¹⁄₆₄ inch. Hence the sloping surfaces, see surfaces 152 and 154 in FIGURE 10 for example, which are coated with a light reflective material provide only a small surface 153 which is dark when apertures 114 and 116 are both illuminated. Where milky white plastic cover plate 136 is mounted flush against front surface 102, the edges of the light pattern are sharply defined and the small unilluminated surface 153 is substantially unnoticeable.

Where for any reason it is not convenient or economical to taper or slope the ends of the partitions near front surface 102, it is also possible to obtain the desired elongated shape of the several segments with close spacing therebetween to provide a sharp character segment outline by the use of an appropriate mask of an opaque material on the rear surface of the translucent cover member 136 shown in FIGURE 8.

Referring now to FIGURE 16, there is illustrated a front cover plate 136 which is formed generally of a translucent material as distinguished from a transparent material so that the interior construction behind the cover plate is not visible and to diffuse the light from the point source lamps. Cover plate 136 may be coated with a suitable opaque material such for example as black paint or enamel in the shaded area indicated generally by the reference numeral 210. The several slots or elongated light emitting apertures 104 through 122 correspond to the similarly numbered slots shown in FIGURE 9. With this form of construction, the small spacing between each of the character segments 104 through 122 is easily obtained, and it is then unnecessary to taper the cavities containing the large lamp bulbs to the precise size and shape of the desired character or segments.

Uniform intensity of illumination throughout the length of each individual character bar is highly desirable in a digit module of this type. Hence the light reflective coating on the interior walls 105 through 123 of the module structure 100 is essential where lamps providing a point source of light are used.

In FIGURES 1, 5 and 9, each of the long character bar segments, C, D, E, F, G, H and J contains two lamps connected in parallel. The use of two lamps was found necessary in order to provide a bar of light having uniform light intensity through the cover plate of the translucent, milky-white Lucite or acrylic resin. In accordance with a further improvement feature of my present invention, only one lamp is used in each of the cavities associated with lamps C through J and at the same time a uniform light intensity is obtained throughout the length of the character bar even when using the inexpensive lamps which are, in essence, a point source.

In accordance with this feature of my invention, a variable density filter 212 in FIGURE 16 is also applied over the light emitting apertures 104 through 122. The masking material is applied in the form of lines either having uniform thickness and variable spacing, or having uniform spacing and variable thickness, in such a manner that uniform light intensity is visible throughout the length of the character bar segment even though illuminated by a point type source of light. Thus, by increasing the amount of masking material at the position directly over the lamp which serves as a point source, and gradually reducing the amount of masking material in accordance with the increasing distance of the position of the masking material from the lamp along the character bar segment, uniform light intensity may be obtained even though only a single point source of light is used.

By a process known in the art as a silk screening process, a suitable mask is formed from a drawing which can be made by empirical methods or from mathematical computation which will show the proper spacing for lines of uniform thickness to provide the desired uniform illumination throughout the length of the character bar segment. The opaque masking material is applied through the silk screen in a suitable manner such as by spraying or daubing with a brush. It is possible by this process to obtain a very precise pattern of lines having substantially uniform thickness with the spacing between the lines varied by a controlled amount to produce an elongated bar or line of light having substantially uniform intensity throughout its length.

The variable density lines 212 shown in FIGURE 16 which are most closely spaced at the position of the lamp in the module structure may be used either with or without the solid opaque mask coating 210 since the sharply defined edges of each of the character bar segments can be provided by the edges of the cavities in the housing structure 100 where the mask coating 210 is not used.

In each of the foregoing constructions, the digital indication for each digit lies in a single plane in the front of the module thereby providing a digital indication which is easily readable from all positions in a large viewing angle and since the same translucent cover is over each digital indication, all digits are displayed with equal intensity.

Referring now to FIGURE 17, there is illustrated a special installation for recording tolls, as for example on bridges or turnpikes wherein certain predetermined digits are adapted to be illuminated upon the closure of corresponding selector switches, indicated schematically in the control unit 230 with the legends .25, .50, .75, 1.00 and 1.50. The operator's unit 230 is connected by a multi-conductor cable 232 to a switching control unit 236 wherein the conductors labeled in the operator's unit are connected to the corresponding pins in terminal 234 of the switching control unit 236. Switching control unit 236 is connected to the digital display unit 238 by a cable 240 having conductors 22 through 37 connected between the corresponding terminal strips 242 and 244.

The digital display indicating unit 238 contains three digit modules of the type shown in FIGURES 7 through 15. The first module 246 in this particular installation is adapted to display the digits 1 or 2, the second module is adapted to display the digits 2, 5, 7 and 0, and the third digit module 250 is adapted to display the digits 0 and 5. Since only the digit module 246 is adapted to display the digit 1, the lamps J may be omitted from the bulb sockets in the base of the digit module. It will be observed that in terminal strip 244, pin 35 is connected to lamps B, C, H and F by lead 252. In terminal strip 242 in the control unit, pin 35 is not used in this specific installation since the maximum toll charge to be made is $1.50, but circuitry was provided in the event toll charges are increased.

In switching unit 236 there is a separate solenoid designated K, L, M, N or R corresponding to the several toll charges to be displayed. Only when solenoid N or R is energized, will the operating power be applied to lamps A, J, and E in module 246 to indicate the digit 1. Power for operating the lamps is supplied from transformer 254 in switching control unit 236 through lead 256 to pin 32 in terminal strips 242 and 244 and from pin 32 along lead 258 to one side of lamps A, J and E. The terminal on the other side of lamps J is connected to pin 22 in terminal strips 242 and 244 and the terminal from the other side of lamps A and E is connected by lead 260 to pin 34 of cable terminals 242 and 244 and from pin 34 on cable terminal 242 to pin 22 of the same cable terminal by lead 262. Pin 22 of terminal 242 is connected by lead 264 to the forward contact of the upper set of solenoid contacts with each of solenoids N and R so that when either solenoid is energized, lamps A, E and J in module 246 will be illuminated to display the indication of 1.

The center digit module 248 displays the digits 2, 5, 7 and 0. A similar lamp arrangement is used for the third digit module 250 which in this embodiment is wired to produce only the digits 5 and 0. In view of the limited number of digits these two modules must produce, a direct additive wiring system is provided by the contacts on solenoids K, L, M, N and R. As this particular type of circuit forms no part of the present invention, further description is believed unnecessary since the operation and construction of the circuit is obvious from the drawing to those skilled in this art.

The installation shown in FIGURE 17 points up the interchangeability of the novel digit module of the present invention with circuits of various types depending upon the demands of the particular installation. In such circuit installations where only one or two digital indications are required, the circuit arrangement is greatly simplified and the digit module assembled with only the lamps necessary for that particular installation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A display device comprising a base member carrying a plurality of lamps, a housing of opaque material adapted to be secured with its rear side adjacent said base member and having channels forming light tight cavities extending from said rear side through to a front side, each of said channels having light reflecting walls enclosing at least one of said lamps and having elongated light emitting apertures oriented to form a part of a character and translucent light diffusing means over said front side of said housing through which a character image is visible, said light diffusing means containing variable density light filters producing a maximum filtering effect at positions over each lamp and producing a gradually decreasing filtering effect as the distance from an associated lamp increases to provide substantially constant illumination throughout the length of said light emission aperture.

2. The display device as defined in claim 1 wherein said variable density light filters comprise a series of parallel lines of opaque material having a uniform thickness and having a variable spacing increasing as the distance of the filter lines from the lamp increases.

3. A display device comprising a base member carrying a plurality of lamps, a housing of opaque material adapted to be secured with its rear side adjacent said base member, there being independent channels in said housing having light reflecting walls forming light tight cavities extending from said rear side through to a front side, said independent channels terminating in slotted apertures in said front side forming part of a character and being disposed in a pattern to produce a visual image of a plurality of different characters, means for securing said base member to said housing with at least one of said lamps in each independent channel, and a single cover plate of translucent light diffusing means over the entire front, said front side of said housing through which said visual image is viewed, said light diffusing means containing variable density light filters producing a maximum filtering effect at positions over each lamp and producing a gradually decreasing filtering effect as the distance from an associated lamp increases to provide substantially constant illumination throughout the length of said light emission aperture.

4. In a digital matrix having at least ten lamps in a housing having ten elongated light emitting apertures with substantially straight, parallel walls in the direction of the longer dimension of the aperture in a front face with one lamp at least providing light for each aperture to selectively produce visible images of digits 1 through 9 and 0 in a digital indicating area in said front face, four of said elongated light emitting apertures having their longer dimensions in a substantially parallel relation with two of said four apertures being in alignment at the top of the digital indicating area, the third of said four apertures being at the center and the fourth of said four apertures being at the bottom of said digital indicating area, and six of said ten elongated apertures having their longer dimensions extending generally perpendicular to said four elongated apertures, a first pair of said six apertures being in alignment and at the left side of said digital indicating area, a second pair of said six apertures being in alignment at about the center of said digital indicating area, and a third pair of said six apertures being in alignment at the right side of said digital indicating area.

5. The matrix as defined in claim 4 wherein said first pair of said six elongated light emitting apertures extends from the top to the bottom of said digital indicating area and said third pair of apertures extends from beneath the two apertures at the top of the digital indicating area to the bottom of said digital indicating area.

6. In combination, a digit module having at least seven independently operative lamps, each having two terminals, in a housing having at least seven elongated light emitting apertures in a front face with one lamp at least mounted to provide light for each aperture to selectively produce visible images of digits 2 through 9 and 0 in a digital indicating area in said front face, and means for singly producing any one of said digits including actuating means for separately producing each digit including switching means, a power supply having two terminals, conductor means connecting one terminal of substantially all the lamps to a common control conductor, first and second contact means associated with the switching means for each of the lamps connected to said common control conductor, said first contact means connecting said common control conductor to one terminal of said power supply when said switching means is actuated and said second contact means selectively disconnecting the power supply circuit from lamps remaining unlighted while a selected digit is displayed.

7. In combination, a digit module having at least seven independently operative lamps, each of said lamps having two terminals, a housing having at least seven elongated light emitting apertures in a front face with at least one of said lamps mounted to provide light for each aperture to selectively produce visible images of digits 2 through 9 and 0 in a digital indicating area in said front face, and means for singly producing any one of said digits comprising actuating means for separately producing each digit, a power supply having two terminals, conductor means connecting one terminal of substantially all the lamps to a common control conductor, means connecting the other terminal of the lamps which are to light when the digit 7 is displayed to one power supply terminal, means connecting the other terminal of the lamps which are to remain dark when the digit 7 is displayed to said one terminal of said power supply through a normally closed switch contact adapted to open when the digit 7 is to be displayed, switching means associated with said actuating means for connecting said common control conductor to the other power supply terminal and for selectively disconnecting lamps remaining unlighted while a selected digit is displayed.

8. The combination as defined in claim 7 having at least nine independently operative lamps and at least nine elongated light emitting apertures to produce also a visible image of the digit 1 by means including at least one lamp to be energized only when the digit 1 is to be displayed and wherein said switching means associated with the digit 1 comprises a first set of contacts for connecting all of the lamps to be energized except said last mentioned lamp to said other power supply terminal independent of said common control conductor, and a second set of contacts to connect said last mentioned lamp to said one terminal of said power supply.

9. In combination, a plurality of digit modules each of the type having seven elongated illuminable segments for selectively producing the digits 2 through 9 and 0 in a digital indicating field, three of said segments being parallel and substantially horizontal and four of said segments comprising two pairs oriented at substantially right angles to and at opposite ends of said three segments with the segments of each pair being in an end to end relation, the improvement comprising a further pair of segments disposed in an end to end relation parallel to and located substantially centrally between said two pairs of segments, and circuit means for illuminating said further segments to produce an indication of the digit 1 to enhance the readability of a plural order number.

10. In combination with a digit module of the type having seven character segments independently illuminated by lamps for selectively producing a desired visual digital indication, circuit means for controlling the selection of the lamps to be illuminated comprising actuating means individual to each digit to be indicated, a common control conductor connected to one terminal of each lamp energized when a digital indication of the digit 8 is produced, first switching means controlled by said actuating means for connecting said control conductor to one terminal of a power supply, circuit means for connecting a second terminal of each of said lamps to another terminal of said power supply, and second switching means associated with the actuating means for each digit excepting for the digit 8 to disconnect the operative circuit to lamps not needed for producing the digital indication of the selected digit.

11. In combination with a digit module of the type having seven principal character segments independently illuminated by lamps for selectively producing a visual indication of a desired digit, circuit means for controlling the selection of the lamps to be illuminated comprising actuating means individual to each digit to be indicated, first switching means associated with each actuating means and second switching means associated with each actuating means for digits where one or more of the lamps used to produce the digital indication of the digit 8 are not energized, a common control conductor connected to one terminal of each lamp energized when the digital indication of the digit 8 is produced and to said first switching means, a power supply for said lamps having one terminal connected to each of said first switching means, circuit means connecting a second terminal of each of the lamps not energized when the digital indication of a digit having a small number of segments illuminated is produced to a second terminal of said power supply through normally closed contacts of the second switch contacts of the actuating means associated with said last mentioned digit, said normally closed contacts being opened when said last mentioned digit is selected, means connecting the lamps energized to produce a digital indication of said last mentioned digit to said one terminal of said power supply, and said other second switching means selectively disconnecting the energizing circuit for the lamps not energized when digital indications of other digits are produced.

12. Apparatus for producing a visual indication of a plural digit number comprising a digit module for each digit to be produced, each digit module being of the type having seven character segments independently illuminated by lamps for selectively producing a desired visual digital indication, a control panel containing actuating means for controlling each digital indication to be produced, switch means associated with said actuating means for energizing a circuit for producing a digital indication of the digit 0 when no other digit is selected in said plural digit number, and selector means for optionally preventing the energization of said last mentioned circuit.

13. Apparatus as defined in claim 12 further having lamp means between two of said digit modules for producing a decimal point indication, and means on said control panel for selectively energizing said lamp means.

14. A cover plate of plastic material sufficiently translucent to diffuse illumination from lamps which are of a point source type into a pattern of substantially uniform illumination, a coating of opaque masking material on one side thereof and elongated light emitting apertures in said opaque material to selectively produce visible images of digits 2 through 9 and 0 in a digital indicating area, three of said light emitting apertures being substantially parallel and at the top, center and bottom of said digital indicating area, and four of said light emitting apertures extending at generally right angles with said first three apertures, two of said four light emitting apertures being in alignment at one side of said digital indicating area and the remaining two of said four light emitting apertures being in alignment at the other side of said digital indicating area.

15. The cover plate as defined in claim 14 further having a variable density filter of opaque material composed of lines of substantially uniform width separated by spaces of varying size to provide substantially uniform intensity of illumination from point source lamps throughout the length of said elongated light emitting apertures.

References Cited in the file of this patent

UNITED STATES PATENTS

| | | |
|---|---|---|
| 683,133 | Mason | Sept. 24, 1901 |
| 862,343 | Nesbitt | Aug. 6, 1907 |
| 1,660,254 | Carroll | Feb. 21, 1928 |
| 1,967,887 | Johnston | July 24, 1934 |
| 2,132,912 | Williams | Oct. 11, 1938 |
| 2,578,844 | Schlatter | Dec. 18, 1951 |
| 2,922,933 | Sack | Jan. 26, 1960 |